US012688316B1

(12) United States Patent
Pugh et al.

(10) Patent No.: US 12,688,316 B1
(45) Date of Patent: Jul. 21, 2026

(54) METHODS AND SYSTEMS FOR DERIVING PERMISSIONS FOR EXTERNAL DATA OBJECTS

(71) Applicant: Tableau Software, LLC, Seattle, WA (US)

(72) Inventors: William Pugh, Seattle, WA (US); Jeffrey Alan Raymakers, Seattle, WA (US); Graeme Riley Britz, Seattle, WA (US); Daniel Adam Rosenthal, Seattle, WA (US); Dmitry Yevgenyevich Ryabkov, Seattle, WA (US); Harsh Verma, Kirkland, WA (US)

(73) Assignee: Tableau Software, LLC, Seattle, WA (US)

( * ) Notice: Subject to any disclaimer, the term of this patent is extended or adjusted under 35 U.S.C. 154(b) by 731 days.

(21) Appl. No.: 16/565,396

(22) Filed: Sep. 9, 2019

(51) Int. Cl.
*G06F 21/62* (2013.01)
*G06F 16/901* (2019.01)

(52) U.S. Cl.
CPC ...... *G06F 21/6218* (2013.01); *G06F 16/9024* (2019.01)

(58) Field of Classification Search
CPC ..................... G06F 21/6218; G06F 16/9024
See application file for complete search history.

(56) References Cited

U.S. PATENT DOCUMENTS

| | | | | |
|---|---|---|---|---|
| 10,783,266 | B2 * | 9/2020 | DeMember | ......... G06F 21/6218 |
| 2005/0076030 | A1 * | 4/2005 | Hada | ................... G06F 16/8373 |
| | | | | 707/999.009 |
| 2006/0080316 | A1 * | 4/2006 | Gilmore | ............. G06F 21/6218 |
| | | | | 707/999.009 |
| 2007/0073694 | A1 * | 3/2007 | Picault | ............... G06F 21/6245 |
| | | | | 707/999.009 |
| 2016/0300395 | A1 * | 10/2016 | Bretschneider | ..... A63F 13/5255 |
| 2017/0154088 | A1 * | 6/2017 | Sherman | ............. G06F 9/45558 |
| 2019/0147178 | A1 * | 5/2019 | Baldwin | ................. H04L 51/52 |
| | | | | 726/28 |
| 2020/0301939 | A1 * | 9/2020 | Hollander | ......... G06F 16/24556 |
| 2020/0356688 | A1 * | 11/2020 | Tan | ..................... G06F 16/2282 |

* cited by examiner

*Primary Examiner* — Cesar B Paula
*Assistant Examiner* — Zelalem Shalu
(74) *Attorney, Agent, or Firm* — Morgan, Lewis & Bockius LLP

(57) ABSTRACT

A method includes accessing a graph that links one or more workbooks, one or more data sources, and one or more data objects. The method includes receiving a request from a user to access metadata of a first data object in the graph. The method includes determining whether to grant permission to the user to access the metadata by: (a) identifying a first workbook of the one or more workbooks or a first data source of the one or more data sources that references the first data object; and (b) determining that the user has permission to access either (i) the identified first workbook or (ii) the identified first data source. The method includes, when the user has permission to access (i) the first workbook or (ii) the first data source, providing the user with access to the metadata of the first data object.

19 Claims, 7 Drawing Sheets

Computing
Device 200

202

Memory 214

| | |
|---|---|
| CPU(s) | Operating System | 216 |

212

Communication Module | 218

206

Web Browser | 220

Data Visualization Application | 222

User interface

Display | 208

Graphical User Interface | 112

Input Device /
Mechanism | 210

Data Visualization
Generator | 226

Permission Generator | 228

204

Directed Graph | 111

Communication
interface(s)

⋮

⋮

Databases / Data Sources | 240

Data Source 1 | 240-1

Data Source 2 | 240-2

⋮

Server System 290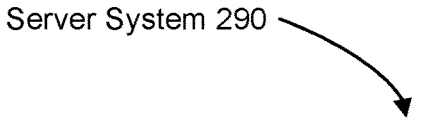

Memory 262

| Operating System | 264 |
| Communication Module | 266 |
| Web Server | 268 |
| Data Visualization Web Application | 270 |

| User Interface Module | 272 |
| Permission Generator | 228 |

| Directed Graph | 111 |
| ⋮ | |

⋮

| Data Visualization Generator | 276 |
| Internal Database(s) | 106 |
| External Database(s) | 102 |

| External Data Objects | 104 |
| External Data Object Permissions | 280 |
| ⋮ | |

⋮

250

CPU(s)

254

256

User interface

Display — 258

Input Devices — 260

252

Communication interface(s)

Figure 2B

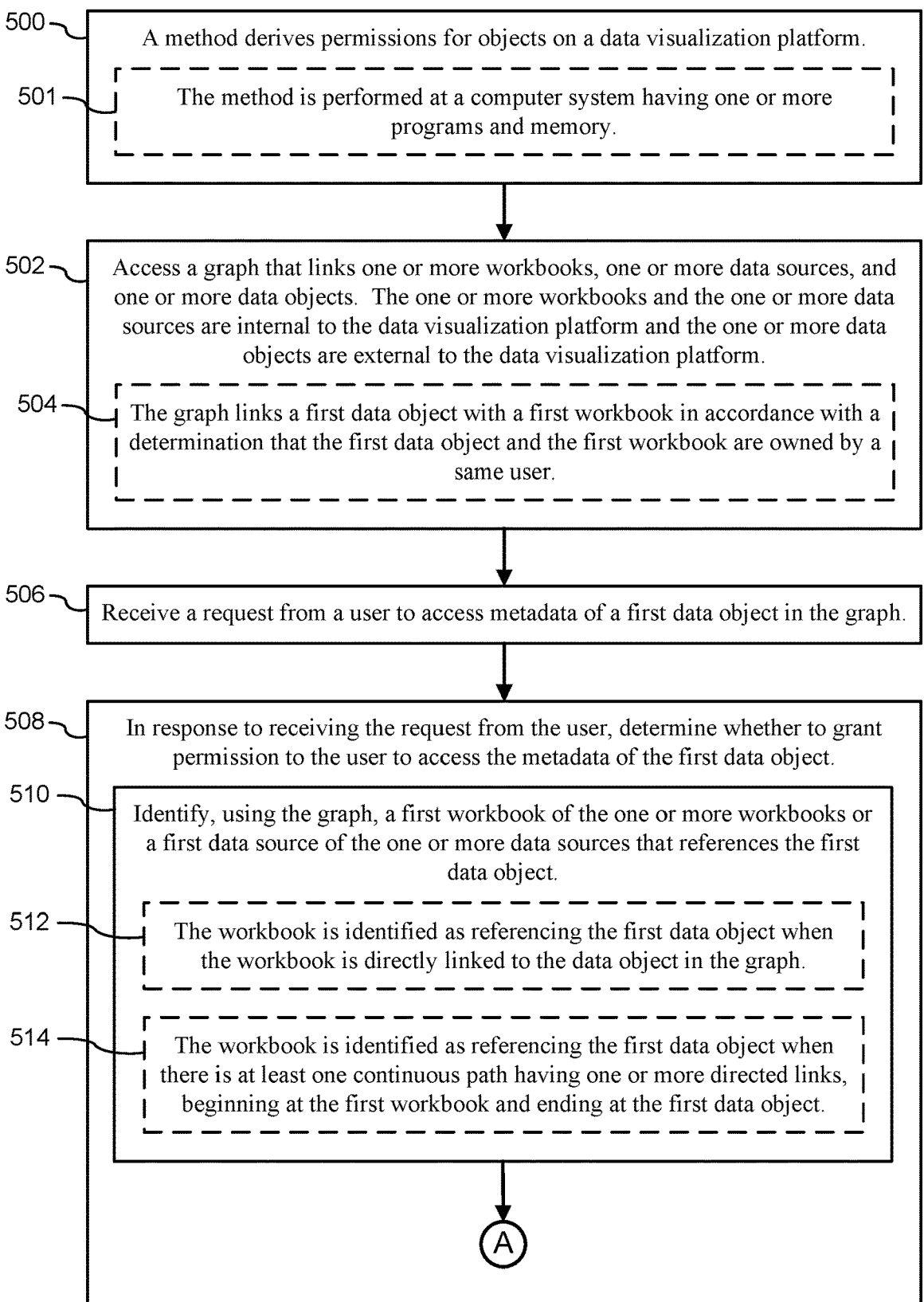

500 — A method derives permissions for objects on a data visualization platform.

501 — The method is performed at a computer system having one or more programs and memory.

502 — Access a graph that links one or more workbooks, one or more data sources, and one or more data objects. The one or more workbooks and the one or more data sources are internal to the data visualization platform and the one or more data objects are external to the data visualization platform.

504 — The graph links a first data object with a first workbook in accordance with a determination that the first data object and the first workbook are owned by a same user.

506 — Receive a request from a user to access metadata of a first data object in the graph.

508 — In response to receiving the request from the user, determine whether to grant permission to the user to access the metadata of the first data object.

510 — Identify, using the graph, a first workbook of the one or more workbooks or a first data source of the one or more data sources that references the first data object.

512 — The workbook is identified as referencing the first data object when the workbook is directly linked to the data object in the graph.

514 — The workbook is identified as referencing the first data object when there is at least one continuous path having one or more directed links, beginning at the first workbook and ending at the first data object.

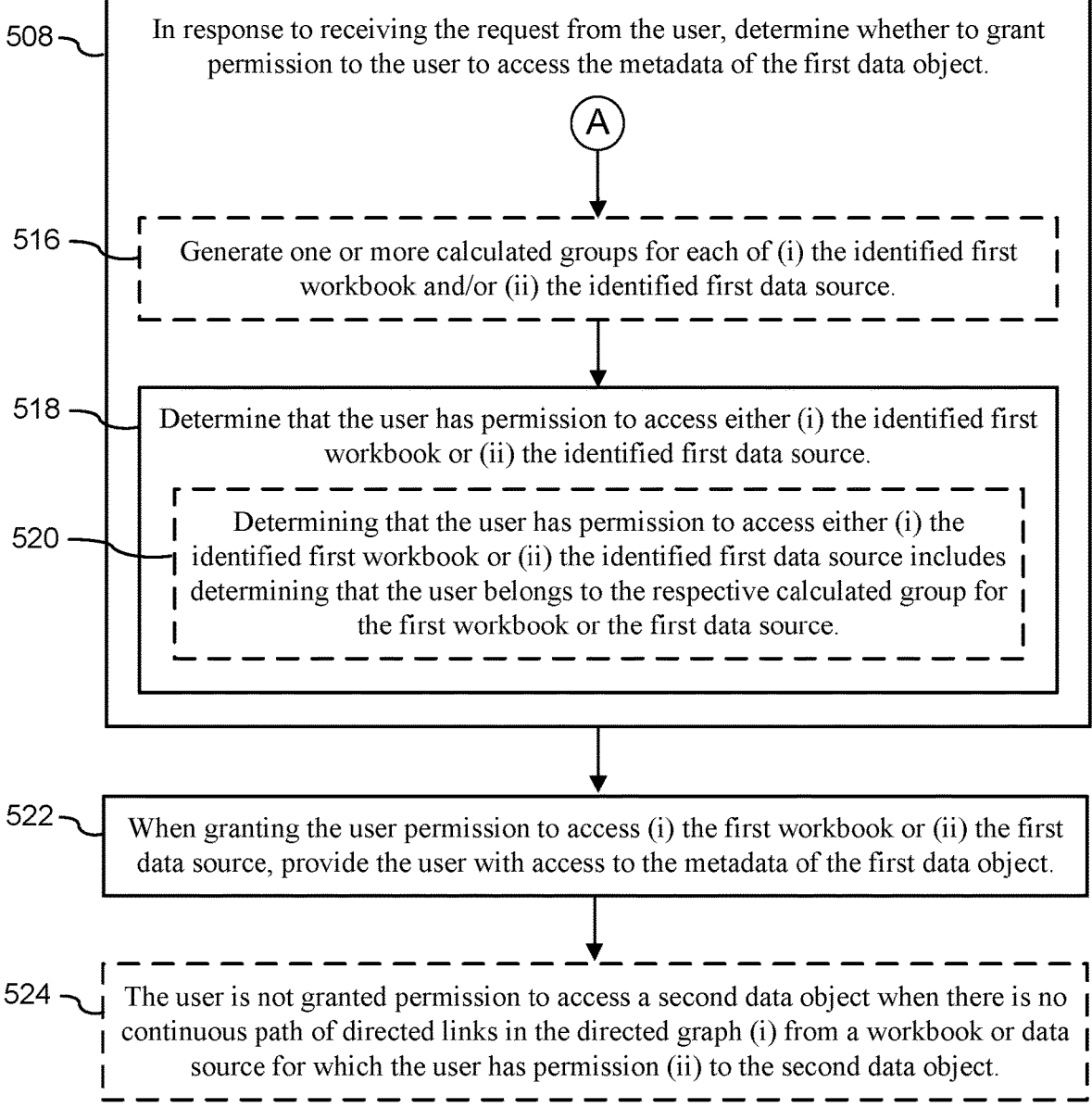

508 — In response to receiving the request from the user, determine whether to grant permission to the user to access the metadata of the first data object.

(A)

516 — Generate one or more calculated groups for each of (i) the identified first workbook and/or (ii) the identified first data source.

518 — Determine that the user has permission to access either (i) the identified first workbook or (ii) the identified first data source.

520 — Determining that the user has permission to access either (i) the identified first workbook or (ii) the identified first data source includes determining that the user belongs to the respective calculated group for the first workbook or the first data source.

522 — When granting the user permission to access (i) the first workbook or (ii) the first data source, provide the user with access to the metadata of the first data object.

524 — The user is not granted permission to access a second data object when there is no continuous path of directed links in the directed graph (i) from a workbook or data source for which the user has permission (ii) to the second data object.

Figure 5B

METHODS AND SYSTEMS FOR DERIVING PERMISSIONS FOR EXTERNAL DATA OBJECTS

TECHNICAL FIELD

The disclosed implementations relate generally to granting a user permission to access data, and more specifically to deriving permissions to certain objects based on permissions to other objects.

BACKGROUND

Data visualization applications enable a user to understand information in a database visually, including distribution, trends, outliers, and other factors that are important to making business decisions. Data visualization applications use data from data objects in databases (such as tables) as inputs to generate the data visualizations. In many cases, databases are stored on computer systems distinct from the computer system where the data visualization application is running.

Within a data visualization application, users can import data from external databases or define data sources that specify how to retrieve data from an external database.

Although it is easy to propagate access permissions to related objects used within a data visualization application, data objects that are external to the data visualization program (e.g., tables in an SQL database) can require manual updates (e.g., by a DBA in an IT organization) to provide a user with access. The data object is thus not readily available to individual users. Such a process may require an administrator to specify exactly which external data objects a user should have permission to access. This requires knowledge (e.g., by IT staff) of all the related data objects, data sources, and workbooks used by a data visualization application. For large databases and/or organizations with a large number of workbooks and/or data sources, this can become very time-consuming. Thus, the technical problem of intuitively propagating access permissions throughout a database can be particularly challenging for a user who is using data objects that are stored externally from the data visualization program.

SUMMARY

In accordance with some implementations, a method of granting users access to metadata of external data objects is performed at a computer system of a data visualization platform. The computer system includes one or more processors and memory. The memory stores one or more programs configured for execution by the one or more processors. The computer system accesses a directed graph that links together one or more workbooks, one or more data sources, and one or more data objects. The one or more workbooks and the one or more data sources are internal to the data visualization platform and the one or more data objects are external to the data visualization platform. The computer system receives a request from a user to access metadata of a first data object in the graph. In response to receiving the request from the user, the computer system determines whether to grant permission to the user to access the metadata of the first data object. The process identifies, using the graph, a first workbook of the one or more workbooks or a first data source of the one or more data sources that references the first data object, and determines that the user has permission to access either (i) the identified first workbook or (ii) the identified first data source. When the user has permission to access (i) the first workbook or (ii) the first data source, the computer system provides the user with access to the metadata of the first data object.

In some implementations, the workbook is identified as referencing the first data object when the workbook is directly linked to the data object in the graph.

In some implementations, the workbook is identified as referencing the first data object when there is at least one continuous path, in the graph, from the workbook to the data object.

In some implementations, the graph links the first data object with the first workbook when the first data object and the first workbook are owned by a same user.

In some implementations, the computer system generates one or more calculated groups for each of (i) the identified first workbook and/or (ii) the identified first data source. Determining that a user has permission to access either (i) the identified first workbook or (ii) the identified first data source includes determining that the user belongs to a respective calculated group for the first workbook or the first data source.

In some implementations, the user is not granted permission to access a second data object when there is no continuous path of directed links in the directed graph (i) from a workbook or data source for which the user has permission (ii) to the second data object.

In accordance with some implementations, a computer system for granting user permissions to access metadata of data objects includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided for automatically deriving permissions for users to access metadata of external data objects.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 2B is a block diagram of a server system, in accordance with some implementations.

FIGS. 5A and 5B provide a flow chart of a method of granting users permission to access metadata of data objects in accordance with some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
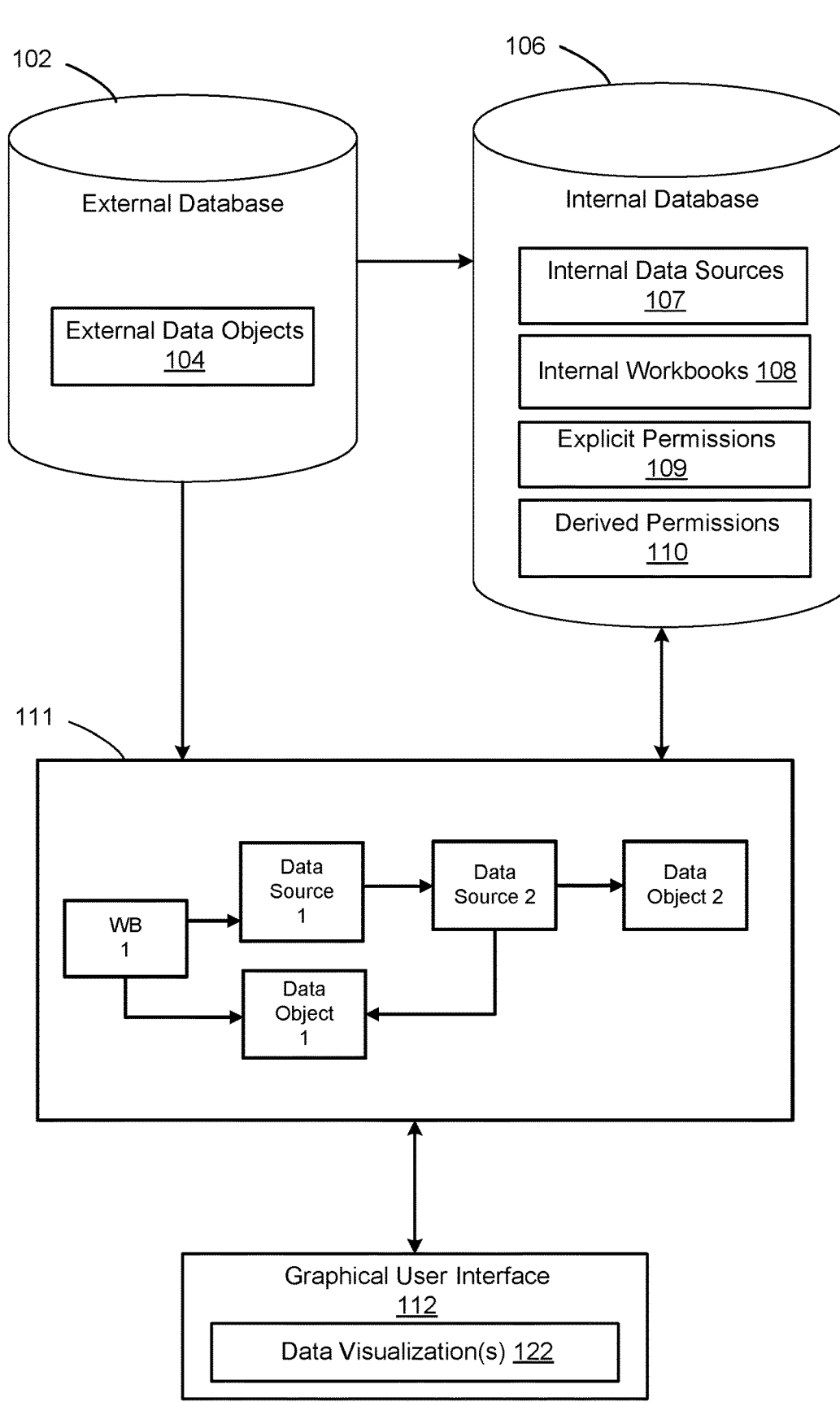
FIG. 1 illustrates conceptually a process of granting access permissions in accordance with some implementations.

Some implementations of an interactive data visualization application use a directed graph 111, which includes representations of internal workbooks, internal data sources, and external data objects, to automatically derive whether to grant users permission to access external data objects 104, as shown in FIG. 1. The internal database 106 is internal to the data visualization application. The internal database 106 identifies the workbooks 108, data sources 107 and data objects 104 that are represented in the graph 111, which may be stored locally (e.g., on the same device that is displaying a user interface) or may be stored externally (e.g., on a database server or in the cloud). The graph 111 also includes information regarding the relationships between each of the objects in the graph. In particular, the structure of the directed graph shows the relationships (e.g., many-to-one relationships) between the workbooks, data sources, and data objects in the graph to be visualized. The graph may be included in a catalog view that illustrates the data that is used to generate data visualizations. The directions of the links indicate usage and point to the "one" side of each many-to-one relationship.

In some implementations, the interactive data visualization application creates a directed graph (e.g., the graph 111) of content, which includes external assets, such as tables, databases, and files, as well as internal content (e.g., internal to the data visualization application) such as workbooks and data sources. This graph includes the data-lineage relationships between all these content. In some implementations, the data visualization application includes a data catalog that automatically learns of the existence of tables and other external assets via the references already contained within the internal workbooks and data sources (e.g., stored on a Server/Site of the data visualization application) and can automatically map the lineage therein at the same time.

As known by those of skill in the art of data visualization applications, a workbook stores information needed to build one or more data visualizations according to the selected data and various parameters (e.g., visual variables that specify roles for selected data fields). In some implementations, each workbook has one or more worksheets, each of which defines a separate data visualization. Worksbooks specify the data to use, which may come from an external database 102 (e.g., objects 104 such as tables or views in an external SQL database), or from an internal database 106 (e.g., a spreadsheet, a CSV file, or a desktop database). In some cases, a workbook accesses one or more data sources 107, which can include data extracts from external databases and/or precompiled queries to extract data from an external database dynamically. When a workbook accesses an external database (directly or indirectly through a data source), the user of the data visualization application needs to have access permission to the appropriate data objects 104.

Users with appropriate permissions in the data visualization application can find the tables referenced by a workbook if they know where to look (e.g. download and view data tab). The user who published a referenced table is likely the one most familiar with the sensitivity of that table and should have the ability to control whether others can find the referenced table or not. However, once a data steward/data owner decides to start managing this table through the catalog, the person should be able to augment that table with additional metadata and explicitly control who is able to see this information. Accordingly, there is a need for a permissions model in the catalog that uses derived/inferred permissions on these "referenced tables." In some implementations, once tables/external assets become explicitly managed, the permissions are managed explicitly.

In some implementations, the derived/inferred permissions determine whether a user can access (e.g., 'View') information (e.g., metadata) about an external asset through server or cataloging functionality within the data visualization platform. The main principle of this model is that if a user has permissions to see an edge from one object to another, that user should be able to see any information contained in that edge. For example, workbooks and data sources contain edges to external assets which contain the following metadata: table names, table column names (at the time a workbook or data source was created), table column data types, database information (hostname, database name, schema), file information (when the external asset is a file) such as (folder name, file path, and file type).

If a user already has sufficient permissions on a workbook to see its edges to external assets, the catalog does not alter those permissions. In some implementations, the catalog introduces new metadata which can be placed on top of external assets, and that new metadata has its own permissions.

In some implementations, the data visualization application performs a data catalog backfill to generate graphical representations (e.g., a directed graph 111) between all of the content, including data sources, workbooks, and workflows, that express relationships between the content. Sometimes, information about all of the external content, such as external tables and databases, is not available during the initial backfill process.

In some implementations, permissions-related properties are attached to data sources, workbooks, and flows, which are generated within the data visualization application. In some implementations, the graph is populated with internal data sources, workbooks, and flows with associated permissions information. The graph may also include external tables and databases. However, the permission information for the external assets is not included in the graph.

After completing the data catalog backfill of the internal content, the data visualization application ingests external content. The graph is then completely populated with all content types (e.g., internal and external) and effective permissions for the content.

In some implementations, the data visualization application derives access permissions for users for external assets, including database servers, databases (e.g., web data connectors and files), tables, files (e.g., local and remote files), and third party flows. In some implementations, external assets have various types of permissions available to grant access to users. For example, a user is granted permission to view metadata, such as the asset's name, descriptions, tags, certification, owner/contact, and information about children of the asset that are not objects with their own permissions. A user may be granted permission to edit the metadata of the external asset, permission to certify the asset and/or fields and/or columns owned by the asset, permission to manage permissions for the asset, and/or permission to notify any downstream connected users from the asset. For example, any workbook owners who are dependent on the external asset (e.g., table) are notified, even if the user does not have permission to see the connected workbook itself.

FIG. 1 illustrates an external database 102. The external database 102 is external to (e.g., stored separately from) a computer system hosting the data visualization application. The external database 102 includes external data objects 104, such as tables that are not stored by the data visualization application locally. In some implementations, the data visualization application imports the external data objects 104, from the external database, to be used by the data visualization application (e.g., to generate visualizations using the external data).

The external database 102 is communicatively coupled with internal database 106. The internal database 106 includes internal data sources 107 (e.g., data sources defined by users of the data visualization application), internal workbooks 108 (e.g., files defined by users of the data visualization application), explicit permissions 109 (e.g., granted by an administrator of the data visualization application to provide users with permissions to access various data), and derived permissions 110 (e.g., derived using the graph 111).

The external database 102 and internal database 106 are communicatively coupled to a graph 111. The graph 111 includes representations of various workbooks, data sources, and data objects stored on the external database 102 and the internal database 106. The graph 111 defines relationships between the representations of workbooks, data sources, and data objects. For example, each workbook, data source, and data object is represented as a respective node in the graph. The nodes of the graph are linked to define relationship between the nodes. For example, when a workbook (e.g., WB 1) references a data source (e.g., Data Source 1) and/or a data object (e.g., Data Object 1), the link is defined by an arrow pointing to the data source and/or data object that is referenced.

A user interface 112 of a computer system is communicatively coupled to the graph 111, the external database 102, and the internal database 106. The user interface 112 is configured to receive user input indicating which data sources and/or workbooks to use to generate data visualizations 122. In some implementations, the user interface 112 is further configured to receive user input creating internal data sources and/or internal workbooks. In some implementations, the user interface 112 is further configured to receive user input indicating filters to be applied to the data sources. The user interface 112 displays, to the user, the data visualizations generated by the data visualization application.

In some implementations, a new internal data source 107 (e.g., or internal workbook 108) is generated using information from a database that includes multiple data sets (e.g., tables). For example, a user provides a selection, through the user interface 112, of data sets in the external database 102 to be included a the data source 107. In some cases, the user may select all of the data sets in the database 102 (e.g., the entire database) or may select a subset of data sets in the database. The user selection may be received through a graphical user interface (e.g., user interface 112) in a data visualization application 222 (or a data visualization web application 270). A user selection may include a primary data set, data fields in the primary data set, and filter conditions to be applied to the selected data fields.

Figure 2A:
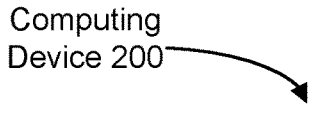
FIG. 2A is a block diagram of a computing device according to some implementations.

FIG. 2A is a block diagram illustrating a computing device 200 that can execute the data visualization application 222 or the data visualization web application 270 (FIG. 2B) to display a data visualization 122. In some implementations, the computing device displays a graphical user interface 112 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 112 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 270);

a graphical user interface 112, which enables a user to build a data visualization by specifying elements visually and displays the data visualizations to the user;

a data visualization generator 226 for generating the data visualizations based on the elements specified by the user on the graphical user interface 112;

a permission generator 228, which generates and uses a directed graph 111 representing relationships between various data sources, data objects, and workbooks to derive additional permissions for users;

zero or more databases or data sources 240 (e.g., including external databases 102 and/or internal databases 106), which are used by the data visualization application 222. In some implementations, the data sources can be stored as spreadsheet files, CSV files, XML files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2A shows a computing device 200, FIG. 2A is intended more as functional description of the various features that may be present rather than as a structural schematic of the implementations described herein. In practice, and as recognized by those of ordinary skill in the art, items shown separately could be combined and some items could be separated.

FIG. 2B is a block diagram of a server system 290 in accordance with some implementations. A server system 290 may host one or more external databases 102, host one or more internal databases 106, and may provide various executable applications or modules. A server system 290 typically includes one or more processing units/cores (CPUs) 250, one or more communication interfaces 252, memory 262, and one or more communication buses 254 for interconnecting these components. In some implementations, the server 290 includes a user interface 256, which includes a display 258 and one or more input devices 260, such as a keyboard and a mouse. In some implementations, the communication buses 254 includes circuitry (sometimes called a chipset) that interconnects and controls communications between system components.

In some implementations, the memory 262 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 262 includes one or more storage devices remotely located from the CPU(s) 250. The memory 262, or alternatively the non-volatile memory devices within the memory 262, is a non-transitory computer-readable storage medium.

In some implementations, the memory 262, or the computer-readable storage medium of the memory 262, stores the following programs, modules, and data structures, or a subset thereof:

an operating system 264, which includes procedures for handling various basic system services and for performing hardware dependent tasks;

a network communication module 266, which is used for connecting the server system 290 to other computers via the one or more communication network interfaces 252 (wired or wireless) and one or more communication networks, such as the Internet, other wide area networks, local area networks, metropolitan area networks, and so on;

a web server 268 (such as an HTTP server), which receives web requests from client devices and responds by providing responsive web pages or other resources;

a data visualization web application 270, which may be downloaded and executed by a web browser 220 on a user's computing device 200. In general, a data visualization web application 270 has the same functionality as a desktop data visualization application 222, but provides the flexibility of access from any device at any location with network connectivity, and does not require installation and maintenance. In some implementations, the data visualization web application 270 includes various software modules to perform certain tasks. In some implementations, the web application 270 includes a user interface module 272, which provides the user interface for all aspects of the web application 270;

the data visualization web application 270 also includes a permission generator 228. The permission generator 228 generates and/or stores directed graphs, such as the directed graph 111, which represents relationships between data sources, data objects, and workbooks. The permission generator 228 uses the graph 111 to derive additional permissions for users;

a data visualization generator 276, which generates and displays data visualizations according to user-selected data sources and data fields;

one or more internal databases 106, which store data used or created by the data visualization web application 270 or the data visualization application 222. The internal databases 106 may store data sources 107, workbooks 108, explicit permissions 109 defined in the data visualization application, and derived permissions 110 as determined by the permission generator; and one or more external databases 102, which store data objects 104 used in generating data visualizations. An external database 102 has permissions 280 that are managed outside of the data visualization platform (e.g., the permissions are managed within an SQL engine).

The internal databases 102 and external databases 106 may store data in many different formats, and commonly includes many distinct tables, each with a plurality of data fields. Some data sources comprise a single table (e.g., a data source may specify a query that retrieves data from a single table in an external database). The data fields include both raw data fields (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields are stored separately from the database.

In some implementations, the internal databases 106 store a set of user preferences for each user. The user preferences may be used when the data visualization web application 270 (or application 222) makes recommendations about how to view a set of data fields. In some implementations, the database 106 stores a data visualization history log, which stores information about each data visualization generated. In some implementations, the database 106 stores other information, including other information used by the data visualization application 222 or data visualization web application 270. The database 106 may be separate from the data visualization server system 290, or may be included within the data visualization server system (or both).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 262 stores a subset of the modules and data structures identified above. In some implementations, the memory 262 stores additional modules or data structures not described above.

Although FIG. 2B shows a server system 290, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 290 may be stored or executed on a computing device 200. In some implementations, the functionality and/or data may be allocated between a computing device 200 and one or more servers 290. Furthermore, one of skill in the art recognizes that FIG. 2B need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world). For example, the internal database 106 may be located on a server (or server system) distinct from a server that stores external databases 102.

In some implementations, the graph 111 is used to derive whether a user should be granted permission to access a data object based on a relationship between the data object and other data sources and/or workbooks for which the user already has permission to access. In some implementations, determining which data objects, data sources and/or workbooks are linked (e.g., in the graph) comprises determining whether a user belongs to derived groups corresponding to the assets in the graph. For example, the data visualization application creates derived groups. A "derived group" (also referred to as a "calculated group") is a system-created group that has the same structure as a normal group (e.g., that represents a set of users) but it is defined using a formula that references other groups instead of explicitly listing each member.

In some implementations, a calculated group is a set of "allowed" groups, a set of "denied" groups, a set of "allowed" users, and/or a set of "denied" users. For example, a group can be defined as including GA(s)=Group Allow(s), GD(s)=Group Deny(s), UA(s)=User Allow(s), and/or UD(s) =User Deny(s).

In some implementations, express permission rules are represented as (only) GAs, using derived groups. For example, if a group has any GD or UD rules then a new derived group is created that is defined as: ((GAs−GDs− UDs)+(UAs−UDs)), where all the rules can then, in principle, be replaced with a single GA rule for this new group.

If a group has any UA rules (and no GD or UD rules), then a new derived group can be defined as (UAs), where all the user allow rules can then, in principle, be replaced with a single GA rule for this new group.

After creating the new derived groups as explained above, all explicit permission rules should be expressible with only GA rules (e.g., without any GDs, UAs, or UDs). One advantage of this representation is that permissions for different content items can be easily combined, with 'OR' semantics.

For example, if the data visualization platform checks if a user is either a project leader for a project OR is granted some capability for an item, the GA rules for the project and the GA rules for the item are combined into a single list of groups. The combined check can then be expressed as a single set of group membership checks against the combined list of groups. (If the user is in any of the groups, the check passes.) The component making the check doesn't need to know anything about project leader; it just checks group membership of a list of groups.

In some implementations, the list of (possibly derived) groups is attached to each content item (e.g., in the graph 111) and the data visualization platform uses those lists to check permissions. In some implementations, the storage size of all the derived groups may exceed a threshold and/or the number of groups attached to each content item may be too large. In some implementations, the groups are adjusted, as desired, to reduce either of both of these, or trade one of them for the other.

In some implementations, to reduce the storage needed for the derived groups, the data visualization platform, for each user, finds all (normal and derived) groups the user is a member of. This set is called a "user class." Each user is in exactly one class. For example, any of the groups (normal or derived) are expressed as a union of some number of user classes and the data visualization platform finds all classes that include that group.

In some implementations, all permission rules are expressed using user classes instead of normal and derived groups. Then, all derived groups are ignored (e.g., not stored) and the information about user classes is used. Since each user is in exactly one class, the storage space for the classes is O(U), where U is the number of users. However, instead of only needing at most a single derived group to express an item's permissions, the data visualization platform may need many user classes. In the worst case, where every user has some special case somewhere, the number of user classes is the number of users.

To mitigate the downside of too many user classes, an optimization to reduce the number of user classes needed on each item may be implemented. For example, instead of ignoring all derived groups, the groups are kept (e.g., stored), but they are expressed as sets of user classes instead of sets of users. In some implementations, this significantly reduces the storage needed for the derived groups if the number classes is much less than the number of users.

In some implementations, the permissions for each item can be expressed either as a set of (normal or derived) groups, or a set of user classes, or a combination (where some, but not all, groups are expressed in terms of their classes).

In some implementations, if a user is a member of a calculated group for a given capability of a given content item, then the user is granted that capability according to the permission rules of that item. In some implementations, when permission rules change, the data visualization platform creates or updates calculated groups as necessary. For example, the calculated groups are a copy of the permission rules and a reference between the content item and its calculated groups is maintained.

Figure 3:
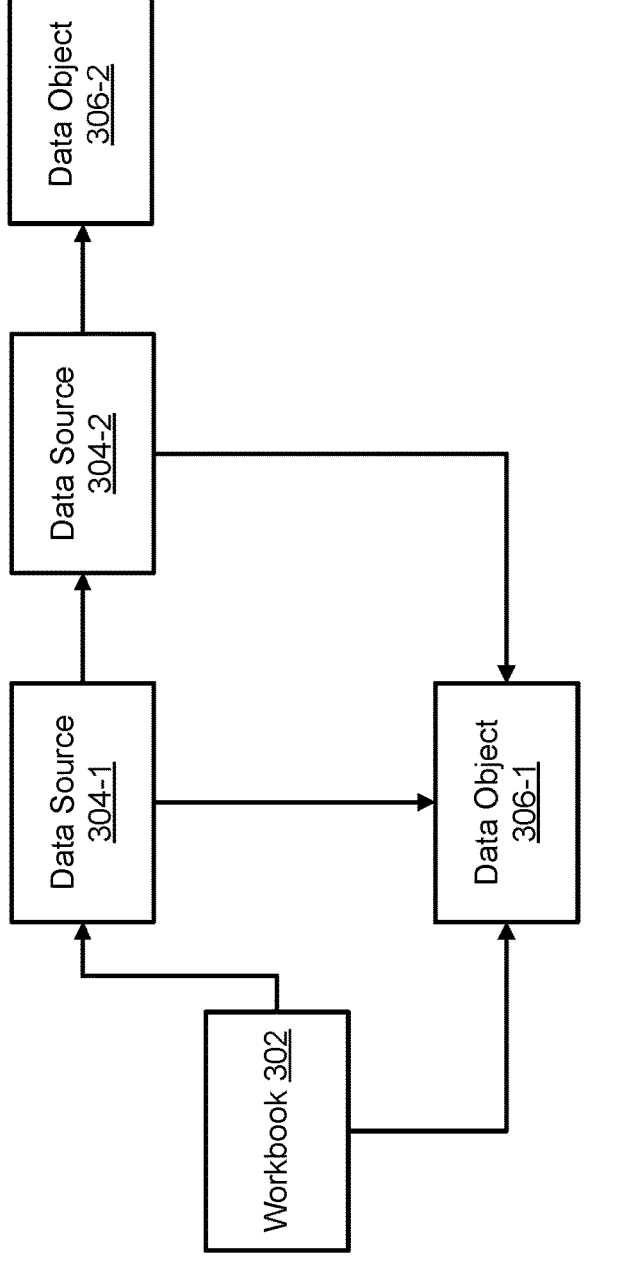
FIG. 3 is a block diagram of a graph having representations of a workbook, two data sources, and two data objects, according to some implementations.

In addition to checking these groups, additional checks are needed for the full permissions algorithm, such as for server or site admin, or license level. These checks are not per item, though, so they are inexpensive. Note that content owner checks can be rolled into the group and user membership checks by simply including the owner id of each content item in the list of user ids to be stored on the catalog item FIG. 3 is a block diagram of a directed graph 111 in accordance with some implementations. In some implementations, the workbook 302 and the data sources 304 (e.g., data source 304-1, data source 304-2) are internal to the data visualization platform. For example, a workbook is a type of file that contains one or more worksheets and/or dashboards for generating data visualizations. In some implementations, a user uses worksheets to build views (e.g., to be generated by the data visualization platform) by selecting fields to include in the views. In some implementations, a user uses dashboards to combine worksheets to be presented on a graphical user interface for the user. In some implementations, data sources are used by one or more workbooks. For example, a user publishes a data source (e.g., to the server of the data visualization platform) so that other users can connect to the published data source from the other users' workbooks. In some implementations, data sources include metadata that describe the connection information (e.g., indicating whether the data is in a live database or an extract, and which data to bring into the data visualization platform), customization and cleanup (e.g., including information to facilitate efficient use of the data), and data access and refresh instructions (e.g., including a location of the underlying database server, network paths for file-based data, and security information such as credentials or access tokens). In some implementations, multiple workbooks can connect to one data source. Because the data source is internal to the data visualization platform, when the data in the data source is updated, all of the internal workbooks that connect to the data source are also updated.

In some implementations, data objects 306 (e.g., the data object 306-1 and the data object 306-2) are stored in a database external to the data visualization platform. For example, the data object 306-1 is a table that is stored outside of the data visualization platform. The workbooks and data sources internal to the data visualization platform reference (e.g., connect) to the data objects that are stored external to the data visualization platform.

As illustrated in FIG. 3, the workbook 302 and the data sources 304-1 and 304-2 reference other data sources as well as external data objects. However, external data objects 306-1 and 306-2 do not reference internal workbooks or data sources. A workbook can use data sources and data objects, a data source can use data objects and other data sources, but a data object does not "use" any workbooks or data sources.

Because internal workbooks and data sources reference external data objects, a user who is granted permission to access a workbook and/or a data source that references a data object, should also be granted permission to access metadata of the data object within the data visualization platform. For example, a first user creates a workbook 302 that includes a reference to the data object 306-1 (the first user has access to the data object 306-1). The user, as the owner of the workbook 302 has permission to access the workbook 302, and can specify permissions for the workbook 302. If a second user has access to the workbook 302, the data visualization platform determines, based on links in the graph 111 (the workbook 302 references the data object 306-1) that the second user has permission to access the metadata for the data object 306-1.

When the first user created the workbook 302, the first user had access to the data object 306-2 indirectly through the two data sources 304-1 and 304-2, as shown in FIG. 3. Because the first user (the owner of the workbook 302) granted permission to the second user to access the workbook 302, the second user has access to the workbook. However, the second user also needs permission to access all of the intervening nodes that link the workbook 302 to the data object 306-2 in the graph. The server system determines whether the second user has permission to access data sources 304-1 and 304-2. If the second user has access to both of these data sources, the server system determines, based on the graph, that the second user should also be granted permission to access metadata of the external data object 306-2. For example, if the second user has permission to access the data source 304-1 but does not have permission to access the data source 304-2, the user is not automatically granted permission to access the metadata for the data object 306-2 (e.g., because the second user does not have permission to access an intervening node on the link between the workbook 302 and the data object 306-2).

In some implementations, the user is granted access only to the metadata for the external data object. For example, the complete data object, which is stored on a database external to the data visualization platform, is not provided to the user. Instead, permissions for the user to view metadata for the external data object are provided based on the user's other permissions within the data visualization platform. For example, the user can see the data field names and data types of the fields, but cannot see the actual data stored in the fields.

Figure 4:
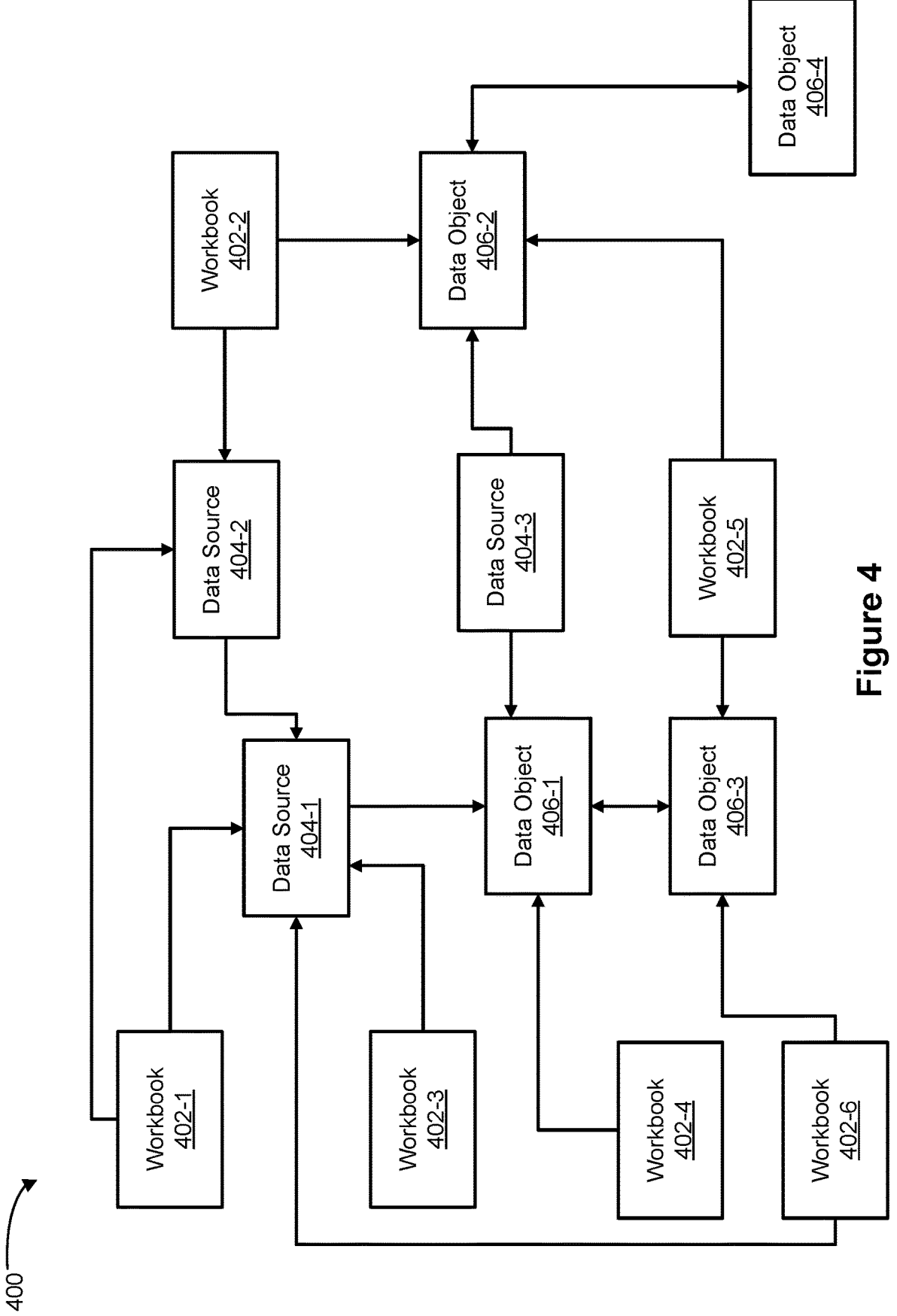
FIG. 4 provides an example of a graph having representations of six workbooks, three data sources, and four data objects, according to some implementations.

FIG. 4 is a block diagram of a directed graph 400 including representations of a plurality of workbooks, data sources, and data objects, and the relationships between the plurality of workbooks, data sources, and data objects. In some implementations, the workbooks and data sources represented in the graph 400 are internal to the data visualization platform, and the data objects represented in the graph 400 are external assets (e.g., stored on a server distinct from the data visualization platform). In some implementations, workbooks can reference other workbooks, data sources, and/or external data objects. In some implementations, data sources can reference other data sources and/or external data objects. In some implementations, external data objects can reference other external data objects (e.g., a database view can retrieve data from one or more database tables).

The data visualization platform can determine if a user has access to metadata for the data object 406-1 (e.g., a table stored in an external database). As indicated in the graph 400, the data object 406-1 is referenced by:

workbook 402-1, indirectly via the data source 404-1;
workbook 402-2, indirectly via the data source 404-2 and the data source 404-1;
workbook 402-3, indirectly via the data source 404-1;
workbook 402-4 via a direct link;
workbook 402-5, indirectly via the data object 406-3; and
workbook 402-6, indirectly via the data source 404-1 and (independently) via the data object 406-3.

Therefore, the data object 406-1 is referenced by all of the workbooks 402-1 through 402-6, in this example. The workbook 402-4 is the only workbook that directly references the data object 406-1. A user who has access to the workbook 402-4 (e.g., to view and/or edit) will be granted permission to access (e.g., view) the metadata for the data object 406-1.

A user who has permission to access the workbook 402-1 will only be granted permission to access the data object 406-1 if the user also has permission to access the data source 404-1. Thus, the user must have access to all intervening nodes (e.g., the data source 404-1) between the workbook 402-1 and the data object 406-1 in order to be automatically granted access to the metadata of the data object 406-1.

Similarly, a user that has permission to access the workbook 402-3 but does not have permission to access the data source 404-1, is not granted permission to access the metadata of the data object 406-1. Because the user does not have permission to access at least one intervening node (e.g., the data source 404-1) between the workbook 402-3 and the data object 406-1, the user is not granted permission to access the metadata for the data object 406-1.

As another example represented by the graph 400, the data object 406-2 is referenced by:

workbook 402-2 (e.g., directly linked);
workbook 402-5 (e.g., directly linked);
data source 404-3 (e.g., directly linked); and
data object 406-4 (e.g., directly linked).

As another example represented by the graph 400, the data object 406-3 is referenced by:

data object 406-1 (e.g., and all assets that data object 406-1 is referenced by, as described above);
workbook 402-5 (e.g., directly linked); and
workbook 402-6 (e.g., directly linked).

As another example represented by graph 400, the data object 406-4 is referenced by data object 406-2 (and all assets that reference data object 406-2, as described above).

FIGS. 5A and 5B provide a flowchart of a method 500 for granting permission to access metadata of an external data object. The method is performed (501) at a computer system 290 having one or more processors and memory. The memory stores one or more programs configured for execution by the one or more processors.

The method 500 is performed at a computer system of a data visualization platform. The computer system of the data visualization platform accesses (502) a directed graph that links one or more workbooks, one or more data sources, and one or more data objects. The one or more workbooks and the one or more data sources are internal to the data visualization platform and the one or more data objects are external to the data visualization platform.

In some implementations, the graph links (504) a first data object with a first workbook when the first data object and the first workbook are owned by a same user. For example, the graph 111 connects the first data object with the workbook when a project owner owns both.

The computer system of the data visualization platform receives (506) a request from a user to access metadata of a first data object in the graph. For example, the server system receives a request from a user to access metadata of the data object 406-3 in FIG. 4.

In response to receiving the request from the user, the computer system determines (508) whether to grant permission to the user to access the metadata of the first data object. The computer system identifies (510), using the graph, a first workbook of the one or more workbooks or a first data source of the one or more data sources. The identified first workbook or first data source references the first data object. The computer system then determines (518) that the user has permission to access either (i) the identified first workbook (e.g., that is internal to the data visualization platform) or (ii) the identified first data source (e.g., that is internal to the data visualization platform). For example, as shown in FIG. 4, the computer system identifies at least workbook 402-5 and workbook 402-6 as referencing the data object 406-3. The computer system determines whether the user has permission to access either the workbook 402-5 or the workbook 402-6.

In some implementations, the workbook is identified (512) as referencing the first data object when the workbook is directly linked (e.g., no intervening nodes) to the data object in the graph. For example, FIG. 3 illustrates direct links between the data object 306-1 and the workbook 302, between the data object 306-1 and the data source 304-1, and between the data object 306-1 and the data source 304-2. FIG. 4 illustrates direct links from the workbooks 402-5 and 402-6 to the data object 406-3.

In some implementations, the workbook is identified (514) as referencing the first data object when there is at least one continuous (e.g., unbroken) path of links, in the graph, from the workbook to the data object. For example, as described with reference to FIG. 4, the data object 406-3 is referenced by the workbook 402-1 indirectly through the data source 404-1 and the data object 406-1 (e.g., the workbook 402-1 references the data source 404-1, which references the data object 406-1, which references the data object 406-3). The computer system identifies the workbook 402-1 as referencing the data object 406-1 because of the continuous set of links. However, the workbook 402-2 is not identified by the computer system as referencing the data object 406-1 because there is no set of direct links between the workbook 402-2 and the data object 406-3.

In some implementations, the server system generates (516) one or more calculated groups for each of (i) the identified first workbook and/or (ii) the identified first data source. In some implementations, determining that a user has permission to access either (i) the identified first workbook or (ii) the identified first data source comprises determining (520) that the user belongs to the respective calculated group for the first workbook or the first data source.

In some implementations, determining that the user has access to (i) the first workbook or (ii) the first data source comprises generating a query to compare a user identification of the user with a list of derived permission group identifications for (i) the first workbook or (ii) the first data source (wherein the user has access if the user id is found in the derived permission group ids; otherwise check for explicit permissions).

When granting the user permission to access (i) the first workbook or (ii) the first data source, the computer system provides (522) the user with access to the metadata of the first data object. Thus, if the user has permission to access workbook 402-1 (and the user has permission to access all intervening nodes, including the data source 404-1 and the data object 406-1), the user is provided with access to the metadata of the data object 406-3. Accordingly, the computer system provides the user with access to the metadata of an external data object based on the permissions within the data visualization platform.

In some implementations, the user is not granted permission (524) to access a second data object. For example, the user is not granted permission to access the second data object when there is no continuous path of directed links in the directed graph (i) from a workbook or data source for which the user has permission (ii) to the second data object.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method comprising:
at a server system of a data visualization platform:
accessing a directed graph having directed links between one or more workbooks and one or more data objects, wherein the one or more workbooks are internal to the data visualization platform and the one or more data objects are external to the data visualization platform;
receiving, via the data visualization platform, a request from a user to access metadata of a first data object in the graph;
in response to receiving the request from the user and in accordance with a determination that the user does not have permission to access content of the first data object, determining whether to grant permission to the user to access the metadata of the first data object by:
identifying, using the graph, a first workbook, of the one or more workbooks, that references the first data object;
determining that the user has permission to access the identified first workbook; and
in accordance with the determination that the user has permission to access the first workbook, providing the user with access to the metadata of the first data object.

2. The method of claim 1, wherein the first workbook is identified as referencing the first data object when the directed graph includes a directed link from the first workbook to the first data object.

3. The method of claim 1, wherein the first workbook is identified as referencing the first data object when the directed graph includes at least one continuous path having one or more directed links, beginning at the first workbook and ending at the first data object.

4. The method of claim 1, wherein the directed graph links the first data object with the first workbook in accordance with a determination that the first data object and the first workbook are owned by a same user.

5. The method of claim 1, further comprising:
generating one or more calculated groups for the identified first workbook;
wherein determining that a user has permission to access the identified first workbook comprises determining that the user belongs to a respective calculated group for the first workbook.

6. The method of claim 1, wherein the user is not granted permission to access a second data object in accordance with a determination that there is no continuous path of directed links in the directed graph (i) from a workbook for which the user has permission (ii) to the second data object.

7. A computer system of a data visualization platform, comprising:
one or more processors;
memory; and
one or more programs stored in the memory and configured for execution by the one or more processors, the one or more programs comprising instructions for:
accessing a directed graph having directed links between one or more workbooks and one or more data objects, wherein the one or more workbooks are internal to the data visualization platform and the one or more data objects are external to the data visualization platform;
receiving, via the data visualization platform, a request from a user to access metadata of a first data object in the graph;
in response to receiving the request from the user and in accordance with a determination that the user does not have permission to access content of the first data object, determining whether to grant permission to the user to access the metadata of the first data object by:
identifying, using the graph, a first workbook, of the one or more workbooks, that references the first data object;
determining that the user has permission to access the identified first workbook; and
in accordance with the determination that the user has permission to access the first workbook, providing the user with access to the metadata of the first data object.

8. The computer system of claim 7, wherein the first workbook is identified as referencing the first data object when the directed graph includes a directed link from the first workbook to the first data object.

9. The computer system of claim 7, wherein the first workbook is identified as referencing the first data object when the directed graph includes at least one continuous path having one or more directed links, beginning at the first workbook and ending at the first data object.

10. The computer system of claim 7, wherein the directed graph links the first data object with the first workbook in accordance with a determination that the first data object and the first workbook are owned by a same user.

11. The computer system of claim 7, further comprising:

generating one or more calculated groups for the identified first workbook;

wherein determining that a user has permission to access the identified first workbook comprises determining that the user belongs to a respective calculated group for the first workbook.

12. The computer system of claim 7, wherein the user is not granted permission to access a second data object in accordance with a determination that there is no continuous path of directed links in the directed graph (i) from a workbook for which the user has permission (ii) to the second data object.

13. A non-transitory computer-readable storage medium storing one or more programs configured for execution by a computer system having one or more processors, and memory, the one or more programs comprising instructions for:

accessing a directed graph having directed links between one or more workbooks and one or more data objects, wherein the one or more workbooks are internal to a data visualization platform and the one or more data objects are external to the data visualization platform;

receiving, via the data visualization platform, a request from a user to access metadata of a first data object in the graph;

in response to receiving the request from the user and in accordance with a determination that the user does not have permission to access content of the first data object, determining whether to grant permission to the user to access the metadata of the first data object by:

identifying, using the graph, a first workbook, of the one or more workbooks, that references the first data object;

determining that the user has permission to access the identified first workbook; and in accordance with the determination that the user has permission to access the first workbook, providing the user with access to the metadata of the first data object.

14. The computer-readable storage medium of claim 13, wherein the first workbook is identified as referencing the first data object when the directed graph includes a directed link from the first workbook to the first data object.

15. The computer-readable storage medium of claim 13, wherein the first workbook is identified as referencing the first data object when the directed graph includes at least one continuous path having one or more directed links, beginning at the first workbook and ending at the first data object.

16. The computer-readable storage medium of claim 13, wherein the directed graph links the first data object with the first workbook in accordance with a determination that the first data object and the first workbook are owned by a same user.

17. The computer-readable storage medium of claim 13, further comprising:

generating one or more calculated groups for the identified first workbook;

wherein determining that a user has permission to access the identified first workbook comprises determining that the user belongs to a respective calculated group for the first workbook.

18. The computer-readable storage medium of claim 13, wherein the user is not granted permission to access a second data object in accordance with a determination that there is no continuous path of directed links in the directed graph (i) from a workbook for which the user has permission (ii) to the second data object.

19. The method of claim 1, wherein the directed graph includes one or more data sources and links between the one or more data sources, the one or more workbooks, and the one or more data objects.

* * * * *